US005509962A

United States Patent [19]
Tang

[11] Patent Number: 5,509,962
[45] Date of Patent: Apr. 23, 1996

[54] CEMENT CONTAINING ACTIVATED BELITE

[75] Inventor: Fulvio J. Tang, Mundelein, Ill.

[73] Assignee: Construction Technology Laboratories, Inc., Skokie, Ill.

[21] Appl. No.: 246,806

[22] Filed: May 20, 1994

[51] Int. Cl.$^6$ .................................................. C04B 07/04
[52] U.S. Cl. ........................ 106/733; 106/735; 106/769
[58] Field of Search ................................. 106/769, 733, 106/715, 735, 739; 428/404

[56] References Cited

U.S. PATENT DOCUMENTS

| | | | |
|---|---|---|---|
| 4,119,467 | 10/1978 | Nudelman et al. | 106/768 |
| 4,496,396 | 1/1985 | Steinbiss et al. | 106/750 |

OTHER PUBLICATIONS

"Influence of Alkalies on the Composition of Belite-Rich Cement Clinkers and The Technological Properties of The Resulting Cements," A. Gies and D. Knofel, *Cement and Concrete Research*, vol. 16, pp. 411–422, (1986). No Month Available.

"Effect of Na, K and Fe On The Formation of $\alpha$– and $\beta$–$Ca_2SiO_4$," K. Suzuki, S. Ito and T. Nishikawa, *Cement and Concrete Research*, vol. 16, pp. 885–892, (1986). No Month Available.

"Hydration and Strength of $\alpha$–, $\alpha'$– and $\beta$–Dicalcium Silicates Stabilize with Na–Al, K–Al, Na–Fe and K–Fe," Kazutaka Suzuki, Proc. 7th Int. Symp. Chem. Cement, Paris, II–47 (1980). No Month Available.

*Primary Examiner*—Paul Marcantoni
*Attorney, Agent, or Firm*—Michael D. Rechtin

[57] ABSTRACT

An article of manufacture and method of manufacture of a cement product composition. A cementitious clinker consisting essentially of an alpha belite and a ferrite phase having a composition of about 0.04–0.13 moles $Na_2O$, 0.03–0.07 moles $K_2O$, 0.09–0.18 moles $Fe_2O_3$, and 2.8 moles dicalcium silicate.

21 Claims, 1 Drawing Sheet

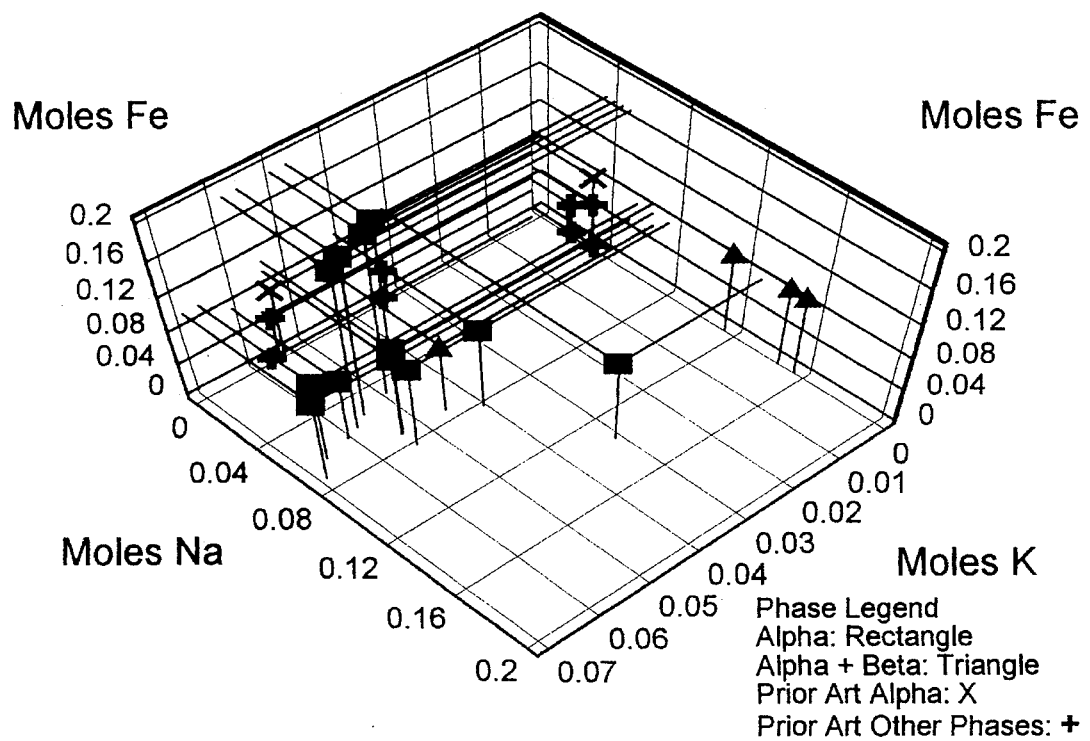

CEMENT CONTAINING ACTIVATED BELITE

The present invention is concerned generally with a hydraulic cement useful for manufacturing cement based products and concrete structures. More particularly the invention is concerned with a hydraulic cement containing an activated alpha belite phase for providing enhanced structural strength in cement-based products.

Conventionally, the most common hydraulic cement, portland cement, is manufactured by heating to about 1450° C. a mixture of limestone and clay materials. This heating step causes partial fusion of the materials to form clinker nodules. These clinker nodules are then mixed with gypsum (about 5 wt. %) and ground to make a conventional portland cement. Such clinker nodules have a composition of approximately 67 wt. % CaO, 22 wt. % $SiO_2$, 5 wt. % $Al_2O_3$ and 3 wt. % $Fe_2O_3$ with the residual being oxides of alkali and other metals. Such portland cement clinker nodules typically have four major phase components: alite, belite, an aluminate phase and an iron-based phase. The alite phase in conventional portland cement is the most important phase since it provides the greatest strength potential to the end product cement. Alite is tricalcium silicate modified by foreign ion incorporation, such as ions of Mg, Al and Fe. Since the alite phase contains the largest amount of lime relative to the other phases, it requires the most amount of heat input to manufacture.

The belite phase in conventional portland cement is the second most important phase in portland cement clinkers. This phase accounts for about 15 to 30 wt. % of the phase composition and is based on a dicalcium silicate ("$C_2S$" where C is CaO and S is $SiO_2$) modified by taking up selected foreign ions. The normal stable form of belite is the beta polymorph with five polymorphs being formable at atmospheric pressure: alpha, alpha prime low, alpha prime high, beta and gamma. The beta polymorph of belite is characteristically slow to react with water and does not contribute much to cement strength potential during about the first seven days of curing; however, at later stages of curing, beta belite is the major strength producing phase. Beta belite has the further attribute that it takes less energy to produce than the alite phase by virtue of its lower lime content.

In the conventional manufacture of concrete structures, it is, of course, important to have early strength to sustain the basic structure. Therefore, while it is known that belite based cements can be relatively easy to make, beta belites made in the conventional manner do not have adequate early strength for commercial applications. In addition, when calcium silicates are mixed with water, hydration reactions result in forming cement gel, calcium hydroxide solution and calcium hydroxide crystallites. The cement gel is generally responsible for the strength of the cementitious system, but calcium hydroxide crystals have very little strength value and are believed to be sites of potential failure initiation. Consequently, efforts have been ongoing for a number of years directed to developing a portland cement clinker with reduced calcium hydroxide phase and containing a reactive belite with properties akin to the alite phase. In one approach, the belite phase was stabilized with addition of particular weight percents of Na/Al; K/Al; Na/Fe and K/Fe. In the Na/Fe and K/Fe systems, alpha and beta belite were crystallized as a single phase but alpha prime phases accompanied the alpha phase. For the other additive combinations, only alpha prime and beta phases were obtained. Various other efforts determined specific additive combinations and clinker cooling rates to stabilize belite phases. However, such efforts generally result in formation of substantial amounts of unwanted calcium hydroxide, and these methods are unable to form the alpha belite phase without the presence of contaminating undesirable belite phases.

It is therefore an object of the invention to provide an improved composition and method of manufacture of portland cement clinker.

It is another object of the invention to provide a novel compositional range for manufacture of an alpha belite cement clinker.

It is yet a further object of the invention to provide an improved composition of cement including a mixture of Na, K and Fe as additives to dicalcium silicate to make an alpha belite cement clinker.

It is also an object of the invention to provide a novel composition and method of making a portland cement having as hydration products a cement gel of relatively low calcium to silicon ratio and reduced calcium hydroxide crystalline content.

It is still another object of the invention to provide an improved portland cement of low permeability after hydration.

It is an additional object of the invention to provide a novel composition and method of manufacture of portland cement clinker producible at lower temperatures and with diminished energy input.

It is yet another object of the invention to provide an improved composition and method of manufacture of a portland cement having high strength and enhanced chemical stability to attack by sulfates, chlorides and selected aqueous solutions.

It is still a further object of the invention to provide a novel article of concrete manufacture and use thereof including a portland cement component primarily containing alpha belite and ferrite phases.

It is yet another object of the invention to provide an improved article of manufacture having improved grindability by virtue of having discontinuous belite particles with a ferrite coating.

It is also an additional object of the invention to provide an improved composition and method of manufacture of cement products using an alpha belite based portland cement clinker ground with (a) small amounts of gypsum or other forms of calcium sulfate and (b) a water reducing agent and/or a form of calcium sulfate or grinding or interblending any of the foregoing with pozzolanic material, such as fly ash, rice hull ash, blast furnace slag, silica fume, activated clays or like conventional materials.

Other advantages and objects of the invention will be apparent from the detailed description and drawings described hereinbelow.

BRIEF DESCRIPTION OF THE DRAWING

The FIGURE illustrates a pseudo-ternary phase diagram of various cement clinker materials with variable compositions of $K_2O$, $Na_2O$ and $Fe_2O_3$.

DETAILED DESCRIPTION OF PREFERRED EMBODIMENTS

In a preferred form of the invention a hydraulic cement clinker can be prepared for use in cement products, such as hydraulic cement based structures. The clinker most preferably includes an active alpha belite phase but can also include a ferrite phase. Virtually no alite or aluminate phases are present in the clinker. It has been determined that a range of combinations of Na, K and Fe content enable stabilization of the alpha belite phase. In the most preferred embodiment the ratio of CaO to SiO$_2$ on an ignited basis is approximately two. A small amount of MgO can also be added to decrease the viscosity of the liquid phase created during the step of heating to form the clinker. Temperatures for producing the clinker preferably range from 1350° C. to 1400° C., but the clinker can also be formed using temperatures ranging from roughly 1250° C. to 1450° C. The preferred range of composition includes selected amounts of Ca, Si, K, Na and Fe; and the most preferred ranges and compositions are illustrated in Table I below:

TABLE I

| | (Weight percent compositions) | |
|---|---|---|
| Oxide | Range | Most Preferred |
| CaO | 59–62 | 60 |
| SiO$_2$ | 29–32 | 30 |
| Fe$_2$O$_3$ | 3–5 | 4 |

TABLE I-continued

| | (Weight percent compositions) | |
|---|---|---|
| Oxide | Range | Most Preferred |
| Na$_2$O | 1–4 | 1.4 |
| K$_2$O | 1–4 | 2.2 |
| MgO | 0.25–2 | 0.5 |

In the pseudo ternary phase diagram of the FIGURE, experimental examples of clinkers are shown in terms of the phase regions of alpha, beta, alpha (predominately) plus beta and beta (predominately) plus alpha. The ternary variables are mole percent K, Na and Fe with the moles of Ca and Si being substantially fixed as noted in Table IIA which lists the experimental samples prepared in the manner explained in the Examples. Table IIB shows the raw mixture preparation which produced the molar fractions of Table IIA. The raw mix preparations are also listed and described in the Examples.

TABLE IIA

| | Example Compositions & Phases | | | | | | |
|---|---|---|---|---|---|---|---|
| Specimen No. | Phase(s) | Moles Ca | Moles Si | Moles K | Moles Na | Moles Fe | Moles O |
| 1 | α | 1.88247 | 0.89181 | 0.05794 | 0.05722 | 0.18422 | 4 |
| 2 | α | 1.88659 | 0.89377 | 0.04936 | 0.04852 | 0.18462 | 4 |
| 3 | α | 1.88832 | 0.89459 | 0.04649 | 0.04415 | 0.18479 | 4 |
| 4 | α | 1.88487 | 0.89295 | 0.05221 | 0.05288 | 0.18445 | 4 |
| 5 | α | 1.96995 | 0.93326 | 0.06063 | 0.05988 | 0.06885 | 4 |
| 6 | α | 1.95127 | 0.92441 | 0.05405 | 0.07299 | 0.09093 | 4 |
| 7 | α | 1.94299 | 0.92048 | 0.05382 | 0.07268 | 0.10186 | 4 |
| 9 | α | 1.95127 | 0.92441 | 0.05405 | 0.07299 | 0.09093 | 4 |
| 10 | α | 1.95239 | 0.92494 | 0.04049 | 0.08202 | 0.09098 | 4 |
| 10m | α* + β | 1.96352 | 0.93021 | 0.04532 | 0.07345 | 0.07777 | 4 |
| 11 | β | 1.96341 | 0.93016 | 0.00000 | 0.07804 | 0.09149 | 4 |
| 11m | α* + β | 1.95444 | 0.92591 | 0.00000 | 0.11424 | 0.09108 | 4 |
| 12 | β | 1.96004 | 0.92856 | 0.00000 | 0.09165 | 0.09134 | 4 |
| 14 | α* + β | 1.94666 | 0.92222 | 0.00000 | 0.14564 | 0.09071 | 4 |
| 15 | α* + β | 1.94445 | 0.92118 | 0.00000 | 0.15457 | 0.09061 | 4 |
| 15m | α | 1.94184 | 0.91994 | 0.03107 | 0.13402 | 0.09049 | 4 |
| 16 | β* + α | 1.94712 | 0.92244 | 0.02996 | 0.11381 | 0.09074 | 4 |
| 17 | β* + α | 1.94348 | 0.92072 | 0.04486 | 0.11360 | 0.09057 | 4 |
| 18 | α | 1.94905 | 0.92336 | 0.05399 | 0.08202 | 0.09083 | 4 |
| 33 | α | 1.95056 | 0.92407 | 0.06604 | 0.06385 | 0.09090 | 4 |
| FI-50 | α | 1.94761 | 0.92268 | 0.06893 | 0.07286 | 0.09076 | 4 |

*predominant phase

TABLE IIB

| | Raw Mix Preparations | | | | | |
|---|---|---|---|---|---|---|
| Specimen No. | Reagent CaCO$_3$ | Tamm's Quartz, SiO$_2$ | Reagent Hematite, Fe$_2$O$_3$ | Reagent MgCO$_3$ | Reagent K$_2$CO$_3$ | Reagent Na$_2$CO$_3$ |
| 1 | 105.7 g | 28.5 g | 8.4 g | 1.1 g | 3.0 g | 2.2 g |
| 2 | 106.7 g | 28.5 g | 8.4 g | 1.1 g | 2.5 g | 1.9 g |
| 3 | 106.9 g | 28.5 g | 8.4 g | 1.1 g | 2.3 g | 1.7 g |
| 4 | 106.5 g | 28.4 g | 8.4 g | 1.1 g | 2.6 g | 2.1 g |
| 5 | 109.5 g | 31.7 g | 3.0 g | 1.2 g | 2.9 g | 2.2 g |
| 6 | 110.5 g | 30.1 g | 4.0 g | 1.2 g | 2.6 g | 2.7 g |
| 7 | 108.4 g | 30.8 g | 4.5 g | 1.2 g | 2.6 g | 2.7 g |
| 9 | 108.2 g | 31.5 g | 4.0 g | 1.0 g | 2.6 g | 2.7 g |
| 10 | 108.0 g | 31.3 g | 4.0 g | 1.0 g | 2.6 g | 3.2 g |
| 10m | 109.3 g | 31.9 g | 3.4 g | 0.9 g | 2.2 g | 2.7 g |
| 11 | 110.3 g | 32.0 g | 4.0 g | 1.0 g | — | 2.9 g |
| 11m | 109.4 g | 31.7 g | 4.0 g | 1.0 g | — | 4.2 g |
| 12 | 109.9 g | 31.9 g | 4.0 g | 1.0 g | — | 3.4 g |

TABLE IIB-continued

Raw Mix Preparations

| Specimen No. | Reagent CaCO$_3$ | Tamm's Quartz, SiO$_2$ | Reagent Hematite, Fe$_2$O$_3$ | Reagent MgCO$_3$ | Reagent K$_2$CO$_3$ | Reagent Na$_2$CO$_3$ |
|---|---|---|---|---|---|---|
| 14  | 108.5 g | 31.5 g | 4.0 g | 1.0 g | —     | 5.5 g |
| 15  | 108.0 g | 31.6 g | 4.0 g | 1.0 g | —     | 5.8 g |
| 15m | 108.0 g | 31.5 g | 4.0 g | 1.0 g | 1.9 g | 4.8 g |
| 16  | 106.9 g | 32.2 g | 4.0 g | 1.0 g | 1.5 g | 4.3 g |
| 17  | 106.4 g | 31.9 g | 4.0 g | 1.0 g | 2.2 g | 4.3 g |
| 18  | 108.3 g | 31.6 g | 4.0 g | 1.0 g | 2.6 g | 3.1 g |

For each preparation in Table IIB the components were intimately mixed, then the resulting mixture was pelletized and reacted at 1400° C.

In Table IIC are illustrated prior art compositions for cements which produce various belite phases. These compositional examples of prior art are also plotted in the FIGURE for comparison purposes.

TABLE IIC

Prior Art Compositions and Phases

| R | Ca | Na | Si | Fe | Al | O | Phases formed | Heating temperature (°C.) |
|---|---|---|---|---|---|---|---|---|
| 0.0 | .40099 | 0.03286 | .12044 | 0.079823 | 0.0 | .36589 | α | 1520 |
| | | | | | | | α | 1440 |
| | | | | | | | α | 1360 |
| 0.0 | .4075 | 0.0334 | .1387 | 0.04867 | 0.0 | .3718 | α, α' | 1520 |
| | | | | | | | α, α' | 1440 |
| 0.0 | .4299 | 0.0200 | .14659 | 0.03238 | 0.0 | .3711 | β | 1520 |
| | | | | | | | β | 1440 |
| 0.0546 | .39203 | 0.00 | .11775 | 0.0780 | 0.0 | .35771 | α | 1520 |
| | | | | | | | α | 1440 |
| | | | | | | | α | 1360 |
| 0.0555 | .39821 | 0.00 | .13555 | 0.04682 | 0.0 | .36335 | α, α' | 1520 |
| | | | | | | | α, α' | 1440 |
| 0.03354 | .42400 | 0.0 | .14456 | 0.03194 | 0.0 | .36597 | β | 1520 |
| | | | | | | | β | 1440 |
| 0.0 | .41825 | 0.03427 | .12563 | 0 | 0.04022 | .38163 | α', β | 1520 |
| | | | | | | | α', β | 1440 |
| 0.0 | .43740 | 0.0203 | .14085 | 0 | 0.02382 | .37754 | β | 1520 |
| | | | | | | | β | 1440 |
| 0.05691 | .40844 | 0.0 | .12268 | 0 | 0.03928 | .37268 | α', β | 1520 |
| | | | | | | | α', β | 1440 |
| 0.03411 | .43125 | 0.0 | .13187 | 0 | 0.02354 | .37223 | β | 1520 |
| | | | | | | | β | 1440 |

As can be noted from the tables and the phase diagram, there are well-defined regions of stability, and associated compositions, for the alpha belite phase. These preferred compositions can thus be produced in clinker form and be used to produce a cement product, such as a hydraulic cement, or other mixture which can take advantage of the excellent properties manifested by the alpha belite phase of the clinker. For example, the clinker can be processed by fine grinding of the clinker alone, fine grinding of the clinker with a small amount of gypsum or other conventional forms of calcium sulfate, fine grinding of the clinker with a water reducing agent and/or a form of calcium sulfate, or fine grinding or interblending any of the foregoing with a pozzolanic material, such as fly ash, rice huh ash, quenched blast furnace slag, silica fume, activated clays or like materials.

The above-described preferred ranges of composition are particularly useful in cement-based products wherein processing can include curing at slightly elevated temperatures, such as about 50° C. or higher. Curing of the product can also be done at room temperature, but the kinetics of curing result in a much slower gain of strength as noted in Table III below. The ultimate strength levels (substantially steady values) are substantially superior to cements having beta belite and/or alite phases also present with alpha belite with such mixed phase cements having compressive strengths of only 10–15,000 psi.

TABLE III

Paste Compressive Strength of αC$_2$S cement, psi

| | Composition (wt. %) | | | |
|---|---|---|---|---|
| | 4.0% Fe$_2$O$_3$ 1.4% Na$_2$O 2.2% K$_2$O | 4.0% Fe$_2$O$_3$ 1.8% Na$_2$O 1.8% K$_2$O | 4.0% Fe$_2$O$_3$ 3.4% Na$_2$O 1.3% K$_2$O | *4.0% Fe$_2$O$_3$ 1.2% Na$_2$O 1.8% K$_2$O |
| 1 Day | 8000 (50° C.) | 200 (50° C.) | 3500 (50° C.) | 3200 (50° C.) 300 (Room Temp) |
| 7 Days | 20,200 (Room Temp) | 16,600 (Room Temp) | — | 30,300 (50° C.) 18,600 (Room Temp) |
| 28 | 25,200 | 25,200 | — | 35,000 |

TABLE III-continued

Paste Compressive Strength of αC$_2$S cement, psi

| Composition (wt. %) | | | |
|---|---|---|---|
| 4.0% Fe$_2$O$_3$ 1.4% Na$_2$O 2.2% K$_2$O | 4.0% Fe$_2$O$_3$ 1.8% Na$_2$O 1.8% K$_2$O | 4.0% Fe$_2$O$_3$ 3.4% Na$_2$O 1.3% K$_2$O | *4.0% Fe$_2$O$_3$ 1.2% Na$_2$O 1.8% K$_2$O |
| Days (Room Temp) | (Room Temp) | | (50° C.) 23,000 (Room Temp) |

*5% CaSO$_4$ was added

When the clinker material is used with one of the pozzolanic materials, the amount of calcium hydroxide in the hardened paste is negligible. This paste also has less than 0.04 moles of calcium hydroxide and aluminate phases. As a consequence of minimizing the calcium hydroxide content, the tensile strength of the hardened paste is about 20% higher than conventional construction grade portland cement. The absence of the calcium hydroxide crystallites also allows the cement to be utilized with various types of fibrous material for reinforcement members. Furthermore, due to the very low percentages of aluminate phases, chemical stability is enhanced which results Ln minimizing vulnerability to sulfate attack. In addition, the tendency of the cement product to undergo rapid stiffening is also diminished.

In the most preferred embodiment the alpha belite phase is a discontinuous phase of grains covered with a thin coating of ferrite. For example, in a typical article of manufacture, the median (fifty percentile) size of belite gains is 32.5 microns with the sixteen to eighty-fourth percentile being from 15 to 62.5 microns diameter. The average distance between alpha belite C$_2$S grains is 3.75 microns with a standard deviation of 2.6 microns. That is, the ferrite phase is about 3.75 microns thick and forms the substantially continuous ferrite matrix. Therefore, the clinker is much more grindable than a microstructure having a continuous matrix of belite which is highly abrasive and difficult to grind. On the other hand, the ferrite phase exhibits much better grinding characteristics, thereby enabling grinding of the clinker without having to reduce a continuous alpha belite phase.

Typical expected uses of an alpha belite based cement would include bridge decks, highway paving, hydraulic works, concrete pipes, macro defect free cement based products and fiber reinforced cement and concrete products.

The following nonlimiting example illustrate various aspects of the invention.

EXAMPLE I

Clinker and cement preparation were carded out by the following procedure: Batches of new mix weighing 1.6 kg were used as a starting material and had the following composition:

| | | |
|---|---|---|
| limestone* | 70.6% | |
| rice hull ash | 22.0% | 85% SiO$_2$ |
| Fe$_2$O$_3$ | 2.4% | Baker Lot #505331, >99% purity |
| Na$_2$CO$_3$ | 2.5% | Fischer Chemical Lot #886795, >99% purity |
| K$_2$CO$_3$ | 2.5% | Sargent-Welch, CAS #584-08-7, technical grade |
| | 100.0% | |

*CaO - 53.88; SiO$_2$ - 0.43%; MgO - 0.62%, SO$_3$ - 0.15; L.O.I. - 43.75%

These constituents were freely ground (−200 mesh) in a large pebble mill and then pressed into 2-in. cylindrical pellets. Next, the pellets were placed in Pt dishes and burned, four pellets at a time, in an electric furnace at 1400° C. for 1 hour. XRD (X-ray diffraction) analysis showed the clinker produced to be mainly α-C$_2$S (active component) with small amounts of free lime. Some small amounts of the latter appear useful for enhancing the hydraulic activity of α-C$_2$S. Results of XRF (X-ray fluorescence) analysis conducted on the clinker (Formulation 1 or "F1") are shown in Table IV.

TABLE IV

CHEMICAL ANALYSIS

| Analyte | Weight % |
|---|---|
| SiO$_2$ | 30.26 |
| Al$_2$O$_3$ | 0.49 |
| Fe$_2$O$_3$ | 4.07 |
| CaO | 59.49 |
| MgO | 0.88 |
| SO$_3$ | 0.17 |
| Na$_2$O | 2.05 |
| K$_2$O | 2.51 |
| TiO$_2$ | 0.04 |
| P$_2$O$_5$ | 0.38 |
| Mn$_2$O$_3$ | 0.10 |
| SrO | 0.02 |
| LOI | 0.21 |
| Total | 100.66 |

Potential for Forming Compounds Calculated per ASTM C 150-89

| | |
|---|---|
| C3S | −4 |
| C2S | 90 |
| C3A | −4 |
| C4AF | 12 |

From the clinker produced, two test cements, each weighing 4 kg, were prepared by grinding in a 1 cu ft steel ball mill for 1½ hours. Their compositions are given as follows:

| F1RH | | F1GS | |
|---|---|---|---|
| clinker | 77.0% | clinker | 64.2% |
| anhydrite (CaSO$_4$) | 7.0% | anhydrite (CaSO$_4$) | 5.8% |
| rice hull ash | 16.0% | granulated slag | 30.0% |
| | 100.0% | | 100.0% |

Both cements have a Blaine (ASTM C 204) fineness of approximately 5000 cm$^2$/g.

EXAMPLE II

Physical testing results on the two test cements of Example I were performed to determine compressive strength (ASTM C 109), sulfate expansion (ASTM C 1012), alkali aggregate reactivity (ASTM C 227), available alkalies (ASTM C 311), and drying shrinkage. For comparison, two ordinary portland cements meeting ASTM C 150 Type I requirements of low alkali (CC-2) and high alkali (CC-1) contents were tested along with the Formulation-1 cements. Due to the high level of mineral additive used in the two test cements, mixing water used in preparing their mortar for compressive strength by ASTM C 109 test was reduced to w/c=0.41. Consolidation of mortar into the 2-in. cube molds was done with the aid of a vibrating table; a similar procedure was also applied to the Type I cement mortar.

Drying shrinkage determination was performed on a 6×15×80 mm thin slab cement paste specimens moist cured for either 7 days or 28 days. Pastes were prepared by mixing cement and water in a Hamilton Beach mixer for a total mixing time of 2 minutes and cast into a specially designed mold to produce the specimens. The w/c ratio used for the Type I cement and the test cements were 0.50 and 0.42, respectively. The cured specimens were then dried over a supersaturated solution of $Mg(NO_3)_2$ (50% RH) in an enclosed jar.

EXAMPLE III

Table V shown below gives the mortar strengths of cement blends made from Formulation-1.

TABLE V

ASTM C 109 - Compressive Strength of Mortar Cubes

| Cement | Compressive Strength, psi | | | | |
|---|---|---|---|---|---|
| | 3 days | 7 days | 28 days | 3 mo. | 1 yr. |
| CC-2 (low-alkali Type I) | 3310 | 5070 | 6060 | 7880 | 7683 |
| F1RH | 1550 | 5090 | 7970 | 9380 | 9880 |
| F1GS | 2530 | 5040 | 6910 | 8310 | 9620 |

The results clearly indicate that they develop strength slower than portland cement, but starting at about 7 days their strengths are comparable. By 28 days the strength has surpassed that of portland cement by as much as 31 percent. Higher strengths are observed after 3 months time lapse. Moreover, at 1 year, the portland cement strength dropped slightly while the examples continued to increase.

Formulation-1 is essentially $\alpha$-$C_2S$, and upon hydration it would be expected to produce higher amounts of C-S-H by vol) compared to portland cement at equal degrees of hydration. In addition, the mineral additives used in the preparation of the two cements contain highly reactive silica such that any $Ca(OH)_2$ being formed during the hydration of $\alpha$-$C_2S$ will ultimately form more C-S-H. This may be the source of their higher strengths.

The results of the sulfate expansion test by ASTM C 1012 (see Table VI) show higher expansion up to 12 weeks of exposure for the Formulation-1 blends. This expansion of about 0.10% remained virtually unchanged starting after about two weeks of exposure, indicating some degree of stability.

| AGE Weeks | F1RH Length | F1GS Length | CC-2 Length |
|---|---|---|---|
| 1 | 0.079 | 0.079 | 0.019 |
| 2 | 0.084 | 0.102 | 0.023 |
| 3 | 0.085 | 0.104 | 0.025 |
| 4 | 0.084 | 0.104 | 0.026 |
| 5 | 0.086 | 0.103 | 0.024 |
| 6 | 0.087 | 0.108 | 0.029 |
| 7 | 0.091 | 0.125 | 0.036 |
| 8 | 0.091 | 0.126 | 0.036 |
| 9 | 0.090 | 0.125 | 0.035 |
| 10 | 0.091 | .0.127 | 0.036 |
| 11 | 0.090 | 0.126 | 0.036 |
| 12 | 0.089 | 0.127 | 0.037 |

Table VII gives the results of the alkali-reactivity test by the ASTM C 227 test. It is apparent from the expansion data that Formulation-1 cement is not as useful on low alkali ordinary portland cement in conditions where reactive aggregates are involved. The degree of expansion shown by Formulation-1 cement is very similar to that of high alkali portland cement.

TABLE VII

Alkali-Aggregate Reactivity

| Age Days | F1RH Expansion % | F1GS Expansion % | CC-1 High Alkali - I Expansion % | CC-2 Low Alkali - I Expansion % |
|---|---|---|---|---|
| 14 | 0.015 | 0.119 | 0.073 | −0.001 |
| 28 | 0.026 | 0.151 | 0.105 | 0.005 |
| 56 | 0.437 | 0.305 | 0.269 | 0.010 |
| 90 | 0.594 | 0.355 | 0.321 | 0.012 |

TABLE VIII

REPORT OF CHEMICAL ANALYSIS 56 day results

| Specimen No. | Sample Description | Available Alkalies (wt. % of cement paste) | | Equiv. % | |
|---|---|---|---|---|---|
| | | $Na_2O$ | $K_2O$ | $Na_2O$ | % $SO_3$ |
| CC-1 (High-Alkali Type I) | Cement paste | 0.19 | 0.84 | 0.74 | .008 |
| CC-2 (Low-Alkali Type I) | Cement paste | 0.09 | 0.07 | 0.14 | .011 |
| F1GS | Cement paste | 0.79 | 0.92 | 1.39 | .148 |
| F1RH | Cement paste | 0.97 | 1.26 | 1.80 | 1.002 |

90 day results

| Specimen No. | Sample Description | Available Alkalies (wt. % of cement paste) | | Equiv. % |
|---|---|---|---|---|
| | | $Na_2O$ | $K_2O$ | $Na_2O$ |
| CC-1 | Cement paste | 0.18 | 0.80 | 0.70 |
| CC-2 | Cement paste | 0.07 | 0.06 | 0.11 |
| F1GS | Cement paste | 0.80 | 0.89 | 1.39 |
| F1RH | Cement paste | 0.92 | 1.19 | 1.70 |

Test results for available alkalies shown in Table VIII are consistent with the ASTM C 227 data if one considers that the alkalies released during cement hydration cause the alkali-silica expansion problem. It is evident that most of the alkalies used as stabilizing additives to obtain the $\alpha$-$C_2S$ phase are ultimately released during hydration; the rest of the alkalies appear to be incorporated in the C-S-H.

The drying shrinkage of pastes made from Formulation-1 cements are considerably higher than that of portland cement paste (see Table IX). Longer curing periods prior to drying favor the former, i.e., lower shrinkage for longer cured pastes.

TABLE IX

Drying Shrinkage Test Results

% Drying Shrinkage (3-slab average)

| | 3d drying | | 7d drying | | 14d drying | | 28d drying | |
|---|---|---|---|---|---|---|---|---|
| | 7d cure | 28d cure | 7d cure | 28d cure | 7d cure | 28d cure | 7d cure | 28d cure |
| CC-2 (Type I cement) | 0.26 | 0.27 (4d) | 0.28 | — | 0.30 | 0.31 (16d) | 0.32 | 0.32 |
| F1RH | 0.64 | 0.44 (4d) | 0.77 | — | 0.85 | 0.66 (16d) | 0.90 | 0.70 |
| F1GS | 0.37 | 0.34 (4d) | 0.47 | — | 0.53 | 0.51 (16d) | 0.60 | 0.55 |

The test results show that $\alpha$-$C_2S$ can produce cement of excellent strength property. This high strength can be achieved with only an active $\alpha$-$C_2S$ clinker component ranging from about 64–77 percent by weight of the cement with calcium sulfate and mineral additive making up the rest. The clinker can be produced from similar raw materials used for portland cement clinker production and at slightly lower clinkering temperature, making it commercially viable. There are apparent limitations to the use this cement. For instance, the high alkali release during hydration might prohibit its use in cases where reactive aggregates may be present. In case of higher sulfate expansion and drying shrinkage, these properties can be improved by further refining the cement composition and optimizing the sulfate content.

While preferred embodiments of the invention have been shown and described, it will be clear to those skilled in the art that various changes and modifications can be made without departing from the invention in its broader aspects as set forth in the claims provided hereinafter.

What is claimed is:

1. A cementitious clinker consisting essentially of an alpha belite phase and a ferrite phase, said clinker composition consisting of about 0.04–0.13 moles Na, 0.03–0.07 moles K, 0.09–0.18 moles Fe, about 1.9 moles Ca and about 0.9 moles Si.

2. The cementitious clinker as defined in claim 1 wherein said clinker includes a calcium sulfate additive.

3. The cementitious clinker as defined in claim 1 further including an additive to said clinker selected from the group consisting of a water reducing agent, a calcium sulfate and a pozzolanic material.

4. The cementitious clinker as defined in claim 1 further including an MgO additive mixed with said clinker.

5. The cementitious clinker as defined in claim 1 wherein said ferrite phase is a continuous matrix phase.

6. A method of making a clinker, the steps consisting of:
   (a) preparing a starting composition consisting of about 88–94 wt. % dicalcium silicate, about 3–5 wt. % $Fe_2O_3$, about 1–4 wt. % $Na_2O$ and about 1–4 wt. % $K_2O$;
   (b) heating said starting composition to a temperature of about 1250° C.–1450° C. to form said clinker; and
   (c) cooling said clinker to room temperature, thereby forming a clinker consisting essentially of an alpha belite phase and a ferrite phase.

7. The method as defined in claim 6 further including the step of adding about 0.25–2 wt. % MgO to said starting composition.

8. The method as defined in claim 6 wherein said dicalcium silicate is prepared by combining about 59–62 wt. % CaO and 29–32 wt. % $SiO_2$.

9. The method as defined in claim 8 wherein the ratio of CaO to $SiO_2$ weight percentage ranges from about 1.9–2.1.

10. The method as defined in claim 6 wherein said clinker upon hydration consists essentially of a product free of calcium hydroxide.

11. A method of making a cement product, the steps consisting of:
    (a) preparing a clinker consisting essentially of alpha belite and ferrite phases and the composition consists of about 2.8–3.0 moles Ca and Si, about 0.09–0.18 moles Fe, about 0.04–0.13 moles Na, and about 0.04–0.07 moles K;
    (b) grinding said clinker; and
    (c) hydrating said clinker to form a cement paste product.

12. The method as defined in claim 11 further including the step of curing said cement product at a temperature of at least about 50° C.

13. The method as defined in claim 11 wherein dicalcium silicate is a source of Ca and Si.

14. The method as defined in claim 11 wherein dicalcium silicate is a source of Ca and Si and $Na_2O$ is a source of said Na, $K_2O$ is a source of K and $Fe_2O_3$ is a source of said Fe.

15. The method as defined in claim 11 wherein said step (b) comprises at least one of the steps of (1) grinding of said clinker with a calcium sulfate, (2) grinding of said clinker with a water reducing agent and (3) grinding said clinker alone and adding a pozzolanic material.

16. The method as defined in claim 11 further including the step of forming said hydrated cement paste product into a finished concrete structure.

17. The method as defined in claim 11 further including the step of forming said hydrated cement paste product into a nonstructural mortar.

18. The method as defined in claim 11 further including the step of forming said hydrated cement paste product into an article of manufacture.

19. The method as defined in claim 11 wherein said clinker consists essentially of an alpha belite phase of dicalcium silicate.

20. The method as defined in claim 11 wherein said cement paste consists of less than 0.04 moles of calcium hydroxide and aluminate compounds.

21. The cementitious clinker as defined in claim 1 wherein said alpha bellite phase is a discontinuous phase coated with the ferrite phase.

* * * * *